US009300758B2

(12) United States Patent
Dilmaghani et al.

(10) Patent No.: US 9,300,758 B2
(45) Date of Patent: *Mar. 29, 2016

(54) EFFICIENT NAME MANAGEMENT FOR NAMED DATA NETWORKING IN DATACENTER NETWORKS

(71) Applicant: International Business Machines Corporation, Armonk, NY (US)

(72) Inventors: Raheleh B. Dilmaghani, Elmsford, NY (US); Bong Jun Ko, Harrington Park, NJ (US); Kang-Won Lee, Nanuet, NY (US); Vasileios Pappas, Elmsford, NY (US); Ramya Raghavendra, White Plains, NY (US); Dinesh C. Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 359 days.

This patent is subject to a terminal disclaimer.

(21) Appl. No.: 13/846,198

(22) Filed: Mar. 18, 2013

(65) Prior Publication Data

US 2014/0173080 A1 Jun. 19, 2014

Related U.S. Application Data

(63) Continuation of application No. 13/716,770, filed on Dec. 17, 2012, now Pat. No. 9,049,252.

(51) Int. Cl.

| | |
|---|---|
| ***G06F 15/173*** | (2006.01) |
| ***H04L 29/08*** | (2006.01) |
| ***H04L 12/745*** | (2013.01) |
| *H04L 29/12* | (2006.01) |

(52) U.S. Cl.

CPC ............ *H04L 67/327* (2013.01); *H04L 45/748* (2013.01); *H04L 61/301* (2013.01)

(58) Field of Classification Search

USPC .................................. 709/223, 227, 245, 246

See application file for complete search history.

(56) References Cited

U.S. PATENT DOCUMENTS

| | | | | |
|---|---|---|---|---|
| 7,721,331 | B1 * | 5/2010 | Rowe | 726/22 |
| 2002/0029297 | A1 * | 3/2002 | Cavanaugh | 709/315 |
| 2002/0199014 | A1 * | 12/2002 | Yang et al. | 709/238 |
| 2009/0174583 | A1 * | 7/2009 | Diaz-Gutierrez et al. | 341/65 |
| 2009/0198954 | A1 * | 8/2009 | Sanders | 711/212 |
| 2010/0195654 | A1 | 8/2010 | Jacobson et al. | |
| 2011/0202775 | A1 * | 8/2011 | Crispin et al. | 713/190 |

OTHER PUBLICATIONS

Wang, Y. et al., "Parallel Name Lookup for Named Data Networking", Global Telecommunications Conference (GLOBECOM 2011), 2011 IEEE, Dec. 5, 2011-Dec. 9, 2011, pp. 1-5.

United States Official Action dated Oct. 10, 2014 received in related U.S. Appl. No. 13/716,770.

* cited by examiner

*Primary Examiner* — Liangche A Wang

(74) *Attorney, Agent, or Firm* — Scully, Scott, Murphy & Presser, P.C.; Preston J. Young

(57) ABSTRACT

The present disclosure relates generally to the field of efficient name management for named data networking in datacenter networks. In various examples, efficient name management for named data networking in datacenter networks may be implemented in the form of systems, methods and/or algorithms.

20 Claims, 8 Drawing Sheets

EFFICIENT NAME MANAGEMENT FOR NAMED DATA NETWORKING IN DATACENTER NETWORKS

RELATED APPLICATION

This application is a continuation of U.S. Ser. No. 13/716,770, filed Dec. 17, 2012, the entire contents of which are incorporated herein by reference.

BACKGROUND

The present disclosure relates generally to the field of efficient name management for named data networking in datacenter networks.

In various examples, efficient name management for named data networking in datacenter networks may be implemented in the form of systems, methods and/or algorithms.

DESCRIPTION OF RELATED ART

Named Data Networking (sometimes referred to herein as "NDN") is a paradigm in which requests (e.g., from a consumer or broker) are routed to a data entity (or data object) using a name such as, for example, alphanumeric characters (in contrast to machine addresses in traditional IP networks). In the NDN paradigm, a user (or consumer) requests named data from a data producer (such a request is sometimes called "interest"). The user's request is forwarded towards the data producer by one or more routers (possibly through one or more NDN brokers) based on the name of the data in the request. The data producer then responds with the requested data.

FIG. 1 shows an example of a conventional named data networking architecture 100. As seen in this example, consumers 101A, 101B and 101C interact with producers 103A, 103B and 103C via brokers 105A, 105B, 105C, 105D, 105E, 105F, 105G and/or 105H.

Still referring to FIG. 1, communication (e.g., requests, responses, data objects) between and among the various entities (indicated by the solid lines between the entities) may be bi-directional. Further, the communication may be carried out via the Internet, an intranet, a local area network, a wide area network and/or any other desired communication channel(s).

Of note, while FIG. 1 shows the various entities communicating, it is to be understood that this FIG. 1 is actually referring to communication by computer system(s) or the like that are owned, leased, operated, used by, in the possession of and/or controlled by each of the entities.

In such an NDN architecture 100, however, the names that are used for routing could be potentially long and are typically structured in a complex manner. Routing requests based on those names or matching them could be fairly expensive (e.g., in terms of processor operations), especially when done at high throughput.

SUMMARY

As described herein, efficient handling (e.g., routing) of named content (that is, data objects) in a datacenter network is provided. In one embodiment, the steps may comprise: defining a first namespace of variable (or arbitrary) name length and a second namespace of fixed name length; identifying a set of all possible names that can be created (e.g., in the datacenter) in the first namespace; defining a mapping from the first name-space to the second namespace; translating (e.g., based on the mapping) a name in a request (e.g., a request packet) from the first namespace to a name in the second namespace; and routing the request (e.g., a request packet) using the translated name (that is, the name in the second namespace).

As described herein, mapping a variable length (or arbitrarily long) name in a first namespace to a fixed size name in a second namespace is provided. In one embodiment, the steps may comprise: determining (and generating) a longest prefix tree characterizing the set of names in the first namespace; collapsing the branches of the longest prefix tree to minimize the number of non-branching paths; using the structure of the collapsed longest prefix tree to determine how to divide the names in the second namespace into segments (and dividing the names in the second namespace into segments); and using the structure of the collapsed longest prefix tree to determine the length of each of the segments of the second namespace.

In one embodiment, a method implemented in a computer system for handling data objects in a datacenter network, wherein the datacenter network has associated therewith a first namespace of variable name length and a second namespace of fixed name length, is provided, the method comprising: identifying, by the computer system, a set of all names that exist in the datacenter network in the first namespace; defining a mapping from the first namespace to the second namespace; receiving, by the computer system, a request including a name of a data object; and translating, by the computer system, the name in the request, wherein the name in the request is translated from a name in the first namespace to a name in the second namespace based at least in part upon the defined mapping.

In another embodiment, a method implemented in a computer system for mapping an arbitrarily long name in a first namespace to a fixed size name in a second namespace is provided, the method comprising: generating, by the computer system, a longest prefix tree characterizing a set of names in the first namespace; collapsing, by the computer system, the branches of the longest prefix tree to reduce a number of non-branching paths; dividing, by the computer system, the second namespace into a plurality of segments, wherein the second namespace is divided into the plurality of segments based at least in part on the structure of the collapsed longest prefix tree; and determining, by the computer system, a length of each of the segments, wherein the length of each of the segments is determined based at least in part on the structure of the collapsed longest prefix tree.

In another embodiment, a computer readable storage medium, tangibly embodying a program of instructions executable by the computer for handling data objects in a datacenter network, wherein the datacenter network has associated therewith a first namespace of variable name length and a second namespace of fixed name length, is provided, the program of instructions, when executing, performing the following steps: identifying, by the computer, a set of all names that exist in the datacenter network in the first namespace; defining, by the computer, a mapping from the first namespace to the second namespace; receiving, by the computer, a request including a name of a data object; and translating, by the computer, the name in the request, wherein the name in the request is translated from a name in the first namespace to a name in the second namespace based at least in part upon the defined mapping.

In another embodiment, a computer readable storage medium, tangibly embodying a program of instructions executable by the computer for mapping an arbitrarily long name in a first namespace to a fixed size name in a second namespace, is provided, the program of instructions, when executing, performing the following steps: generating, by the computer, a longest prefix tree characterizing a set of names in the first namespace; collapsing, by the computer, the branches of the longest prefix tree to reduce a number of non-branching paths; dividing, by the computer, the second namespace into a plurality of segments, wherein the second namespace is divided into the plurality of segments based at least in part on the structure of the collapsed longest prefix tree; and determining, by the computer, a length of each of the segments, wherein the length of each of the segments is determined based at least in part on the structure of the collapsed longest prefix tree.

In another embodiment, a computer-implemented system for handling data objects in a datacenter network, wherein the datacenter network has associated therewith a first namespace of variable name length and a second namespace of fixed name length, is provided, the system comprising: an input element configured to receive a request, wherein the request includes a name of a data object; an identifying element configured to identify a set of all names that exist in the datacenter network in the first namespace; a defining element in operative communication with the identifying element configured to define a mapping from the first namespace to the second namespace; a translating element in operative communication with the input element and the defining element configured to translate the name in the request, wherein the name in the request is translated from a name in the first namespace to a name in the second namespace based at least in part upon the defined mapping; and an output element in operative communication with the translating element configured to output the translated name in the second namespace.

In another embodiment, a computer-implemented system for mapping an arbitrarily long name in a first namespace to a fixed size name in a second namespace is provided, the system comprising: a generating element configured to generate a longest prefix tree characterizing a set of names in the first namespace; a collapsing element in operative communication with the generating element configured to collapse the branches of the longest prefix tree to reduce a number of non-branching paths; a dividing element in operative communication with the collapsing element configured to divide the second namespace into a plurality of segments, wherein the second namespace is divided into the plurality of segments based at least in part on the structure of the collapsed longest prefix tree; a determining element in operative communication with the collapsing element and the dividing element configured to determine a length of each of the segments, wherein the length of each of the segments is determined based at least in part on the structure of the collapsed longest prefix tree; and an output element in operative communication with the dividing element and the determining element configured to output the divided segments and the length of each of the divided segments.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

Figure 1:
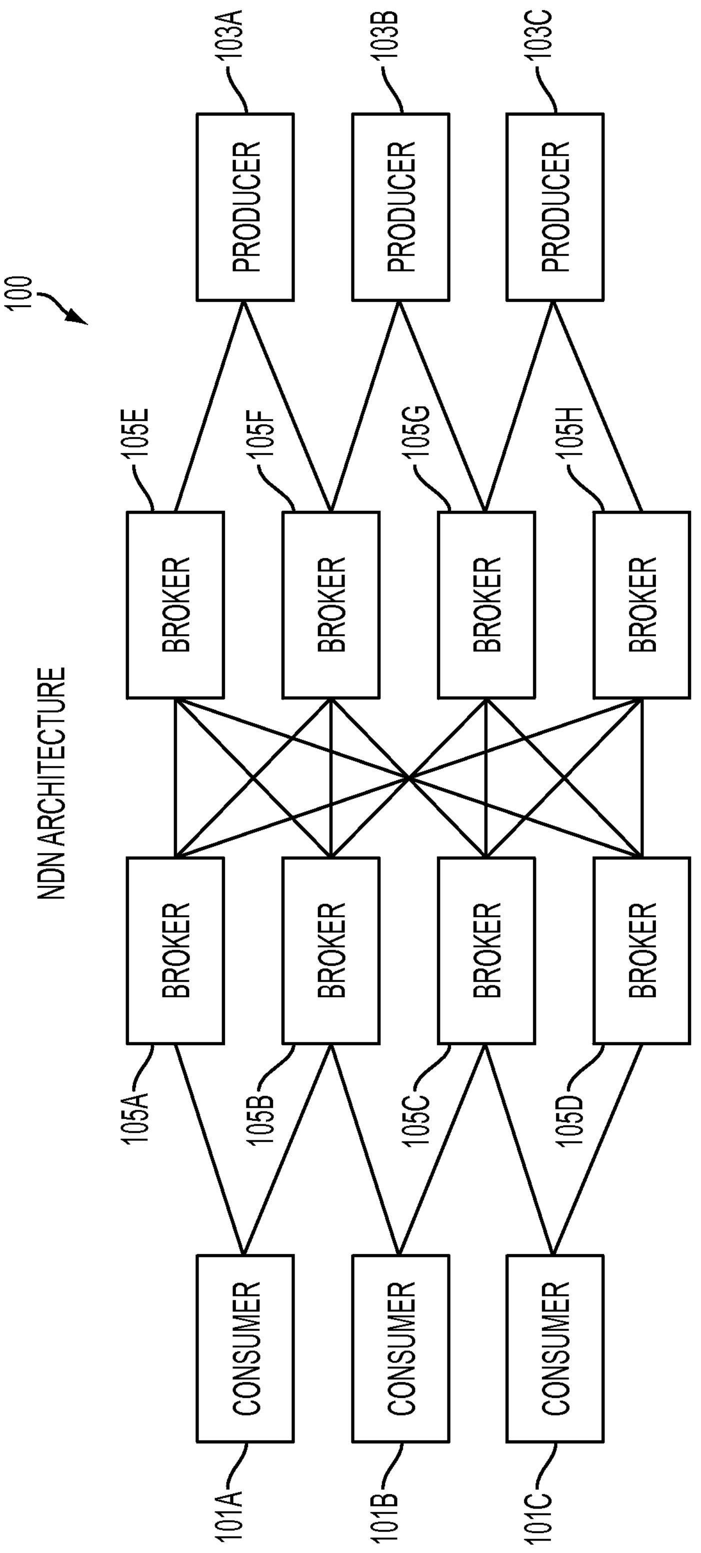
FIG. 1 depicts a block diagram of a conventional named data architecture.

For the purposes of description, the term “data object” is intended to refer to a sequence of bytes of a given length. Such a data object can be, for example, a single addressable content that a user can request. In other examples, a data object can be a segment of a file, or a file, or a collection of files, or a sequence of bytes that is generated dynamically. In other examples, a data object can be an audio file, a video file or a web page. In another example, a data object can be a part of a large file (e.g., a movie file can be broken down into multiple parts, each of which can be individually addressed and downloaded).

For the purposes of description, the term “datacenter” is used to refer to a location, either centralized or distributed, which is used to host servers and other computing equipment to connect to an external network such as the Internet. The term “datacenter network” is intended to refer to a subset of all possible networks that interconnect all the servers and computing equipment in a datacenter with each other, and to an external network such as the Internet. The above definition of datacenter and datacenter networks are commonly used in the state of the art. However, for the purpose of this disclosure, one can define datacenter in a more general manner. A datacenter in this disclosure is used to refer to a set of computing devices which are connected by a network, and where the names of all the data objects stored in the datacenter at any time are known to some entity in the set of computing devices.

For the purposes of description, the term “namespace” is intended to refer to a collection of all possible names that can be defined according to an established set of conventions. For example, a namespace may be defined to include any name defined as a Universal Resource Identifier (URI) according to the set of conventions defined in Internet standard RFC 2396. Another example of the namespace is the set of all names defined as Domain Names according to the set of conventions defined in Internet standard RFC 1034. The characteristics of names are established by the conventions defining the namespace. A namespace can define names of arbitrary length, or a namespace can define names of fixed length.

For the purposes of description, the term “tree” “or “tree shaped structure” is intended to refer to a data-structure which contains no cycles. A tree is defined as a collection of nodes and links, one such node being designated as a root node, and the nodes are connected to the other nodes using links such that there is exactly one path from the root node to any other node. This structure is familiar to a person who is versed in the state of the art of computer networks.

For the purposes of description, the term “longest prefix tree” “or “longest prefix tree shaped structure” is intended to refer to a tree shaped structure in which the nodes are a collection of names, and the nodes are arranged so that the path from the root node to a given node consists only of nodes that have a common prefix in the name to the given node, i.e.

their names begin with some shared substring, and furthermore each node on the path shares the longest possible prefix in its name with the name of the given node.

For the purposes of description, the term “path” is intended to refer to a set of links in a graph structure consisting of nodes and links, which allows one to reach one node from another node by following the set of links.

For the purposes of description, the term “longest path” is intended to refer to a path which is longer than any other path meeting the same characteristics.

For the purposes of description, the term “node” is intended to refer to an element in a data structure known as a graph or tree, and is well known in the current state of the art.

As described herein, in one embodiment the architecture of a named data networking system applied to datacenter networks consists of three constructs: (a) “name consumers” that ask for content, that is, data objects (typically on behalf of external requests); (b) “name producers” (which typically create content, that is, data objects, with new names); and (c) “name brokers” (which route requests associated with names).

In one example, there are two namespaces for each data object. The first namespace comprises long names for data objects. Each long name may be encoded in a variety of manners, but in various examples each long name will have the general structure of a Uniform Resource Identifier (“URI”) or a hierarchical structure name. Such a name can be represented in general in the form of a/b/c/d where a, b, c and d each represent a string of variable length.

The second namespace comprises fixed length names for the data objects. As an example, this second namespace may comprise names having a structure such as a 128 bit long name (in this example, such a namespace can hold up to $2^{128}$ names). A name which is of fixed size is easier to handle for purposes of lookup and routing (e.g., among the information brokers). A name of 128 bits long will typically be several orders of magnitude greater than any reasonable estimate of the number of data objects that can be existing in a particular datacenter network. In this disclosure, the term long names is used for names belonging to the first (variable-length) namespace and the term short names is used for names belonging to the second (fixed-length) namespace, because names in the variable-length namespace will generally tend to be longer than names in the fixed-length namespace. However, this does not imply that all names in the first namespace are always longer than all names in the second namespace.

In one embodiment, the mapping of the first namespace (having variable length or “long” names) to the second namespace (having fixed length or “short” names) and the associated support for network operations is as follows:

1. Getting the set of all possible names (that is, names having unlimited length) that are currently being used in the first namespace (that is, the first namespace associated with a particular datacenter network). 2. Defining a mapping from the first namespace to the second namespace (that is, the second namespace associated with the particular datacenter network). 3. Translating a long name (in the first namespace) of any incoming request into a short name (in the second namespace) using the mapping that is defined. 4. Using the translated name (that is, in the second namespace) in request routing and/or searching for content (that is, the data object).

The step of defining a mapping can be invoked at various points in time. In one example, the defining of the mapping may happen every time a new data object name is introduced into the system (that is, the datacenter network). In another example, time may be divided into epochs, and the mapping redefinition may be done at the beginning of an epoch. In another example, time may be divided into epochs, and the mapping redefinition may be done at the ending of an epoch. In another example, the mapping definition may be modified once a threshold of new names has been reached and/or a time-interval has elapsed.

Any desired algorithm may be used to map from the variable length or “long” namespace to the fixed length or “short” namespace. In one specific example, the following algorithm may be used:

1. All the long names that exist in a particular datacenter are arranged in a tree shaped structure so that the path from the root of the tree to the node representing a particular name spells out its long name. This tree arrangement is the one formed when names are arranged in a tree in order to maximize matching their longest prefix. 2. The tree is shortened so that any path which has no branches is compressed together into a single node. 3. The length of the longest path in the tree is determined. The short name space is then divided into a corresponding number of sections (that is, the short namespace is divided into a number of sections equal to the number of nodes in the longest path in the tree). 4. The length of each section of the short namespace is determined by identifying the minimum number of bits that can accommodate the branches that emanate out of that node, or any other peer (parallel) node in the tree.

The above-described process is shown illustratively for an example consisting of four names:

/abc/efg/ijk/lmn
/abc/efg/ijk/uvw
/ab/uv/jk
/ab/efg

Figure 2:
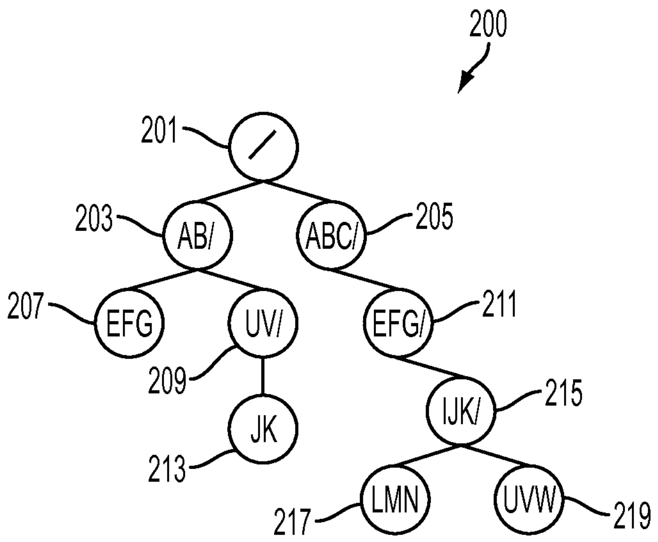
FIG. 2 depicts an example tree structure according to an embodiment of the present invention.

If the names are arranged into a tree structure using the / as the dividers (see step 1 above), and trying to match the longest prefix in creating the tree structure (see step 1 above), the result would be a tree that looks that shown in FIG. 2. More particularly, node 201 is the root node, node 203 is the “ab/” node, node 205 is the “abc/” node, node 207 is the “efg” node, node 209 is the “uv/” node, node 211 is the “efg/” node, node 213 is the “jk” node, node 215 is the “ijk/” node, node 217 is the “lmn” node, and node 219 is the “uvw” node.

Figure 3:
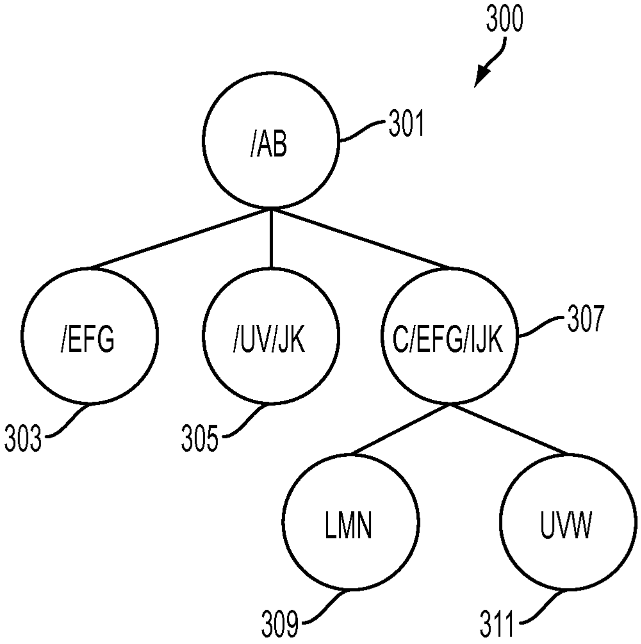
FIG. 3 depicts another example tree structure according to an embodiment of the present invention.

If the portions of the tree without any branches are collapsed (see step 2 above), and if the longest prefixes are combined at each layer into a common ancestral node (see step 2 above), the result would be a tree that looks like that shown in FIG. 3. More particularly, node 301 is the “lab” node, node 303 is the “/efg” node, node 305 is the “/uv/jk” node, node 307 is the “c/efg/ijk” node, node 309 is the “lmn” node, and node 311 is the “uvw” node.

The longest tree branch created in this manner for this example has a depth of three, so in this example the short namespace needs to be divided into three groups. At the last branching depth level of the tree, the maximum number of children of any node in this example is 2 (see nodes 309 and 311), so the third group just needs to be one bit long to represent the branching. At the next level, there are three children (see nodes 303, 305 and 307), so 2 bits are needed to represent it, and the topmost level is just one node, which can be taken out of the namespace altogether. Thus, this tree can be represented in a namespace of fixed size which is three bits or longer (three bits could be used to represent 8 names totally, and having a large size namespace makes it easy to preserve the structure when there are (as in this example) only 4 valid names).

In the above example, there is only one node with children at each depth of the tree. In general, there will be multiple nodes with children at any depth, and the maximum of the number of children will need to be taken into account to decide on the number of bits needed to name the structure at that level.

With the example name size of 128 bits in fixed size (or even 32 bits in fixed size) it is likely to have a namespace which is a few orders of magnitude larger than the number of valid names in a particular datacenter at any time. Therefore, the approach discussed above should be able to define a mapping in most cases. In those cases where the structure cannot be defined in this manner, some of the nodes in the tree can be compressed, e.g. if only 2 bits are available to define the name, the terminal nodes ending (in this example) in "/lmn" (node 309) and "/uvw" (311) may be combined. Any name with prefix /abc/efg/ijk would be mapped to the same short name, and a linked list could be used to identify which specific named data object is being referenced. The request of this example would then have a short name in its header and an additional field in the payload which indicates the specific data object being looked for.

The boundaries of the different levels in the short names (i.e., the counterpart of the divider in the long names) can be identified in a variety of ways. In one example, the number of bits for each level in the short names is pre-determined at the time the mapping of all names into corresponding short names in the datacenter takes place, and these numbers of bits may be distributed to and assumed by all entities in the network that use the short names in the routing request and/or matching. In another example, mask bits of the same length as the short names' length can be used to identify the number of bits for each level in the short names, where the mask bits are used as an altering patterns of 0's and 1's. For example, 1110010001 . . . represents 3 bits, 2 bits, 1 bit, 3 bits, and so on to be used for 1st, 2nd, 3rd, 4th, . . . levels in the short names, respectively. In another example, the number of bits for each level can be explicitly added at the end of the short name bits. For example, if the maximum number of bits used for each level is 7, binary codings of 3-bit numbers (0 to 7) are added as optional fields at the end of the short name.

The above algorithm is designed to take into account a current set of names available in a particular datacenter, and to produce the least possible number of bits for the same. When there are extra bits available in the short namespace, they can be allocated in a variety of ways to the different levels of the tree that is generated in the above algorithm. One way to determine the number of additional free bits would be to predict the rate of growth in names in different portions of the namespace based on past history. As an example for forecasting, one can look at the rate at which names have grown over a past few time-periods (e.g. the number of new names that were added every day for the past thirty days) and use the average of that to predict the rate at which new names will be added. Other more sophisticated algorithms for predicting rate of growth of names based on past history are known in the current state of the art. In this regard, a variety of known algorithms, e.g. Holt-Winters Algorithm, or ARIMA (Auto Regressive Integrated Moving Average) models, may be used to predict the rate of growth in different parts of the namespace, and allocate extra bits to account for the relative amount of anticipated growth.

As described herein is an approach in which the compression of the names is done purely on the long name in the original namespace, and the matching of names is done on the basis of longest prefixes. However, in other examples, other factors may be incorporated into this compression, e.g. information about the location of the names could be used to determine whether or not to compress the names. As an example, if name "/abc/efg" and name "/abc/uvw" are known to be located on the same machine (that is, computer) of a particular datacenter, they could be combined even if they have different secondary prefixes. Thus, other factors than just names can be included to decide when to collapse some nodes of the original name space tree into a smaller one.

As described herein is an approach where the names are computed from scratch at every epoch. One variation would compute the names so that the mappings of the existing names are not changed (to the maximum extent possible). This can be done, for example, by adding the new names to an existing tree of compressed names, and then running the steps of the compression/allocation of bits that have been described earlier. In another example, this incremental update (preserving the names) can be done when new names are created in an epoch, and then after a few epochs, do a re-computation of name mappings from scratch to get back to a mapping which uses the least possible number of bits.

Figure 4:
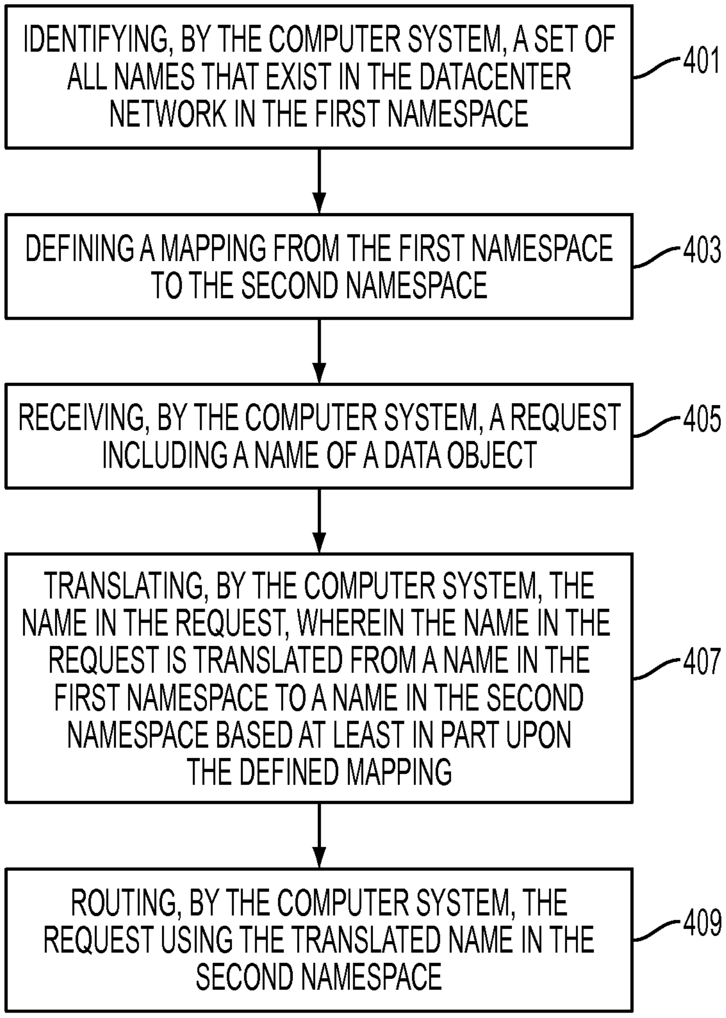
FIG. 4 depicts a block diagram of a method according to an embodiment of the present invention.

Referring now to FIG. 4, a method implemented in a computer system (or network) for handling data objects in a datacenter network, wherein the datacenter network has associated therewith a first namespace of variable (or arbitrary) name length and a second namespace of fixed name length is shown. As seen in this FIG. 4, the method comprises: Step 401—identifying, by the computer system, a set of all possible names that can be created in the datacenter network in the first namespace; Step 403—defining a mapping from the first namespace to the second namespace; Step 405—receiving, by the computer system, a request including a name of a data object; Step 407—translating, by the computer system, the name in the request, wherein the name in the request is translated from a name in the first namespace to a name in the second namespace based at least in part upon the defined mapping; and Step 409—routing, by the computer system, the request using the translated name in the second namespace.

In one example, any steps may be carried out in the order recited or the steps may be carried out in another order.

Figure 5:
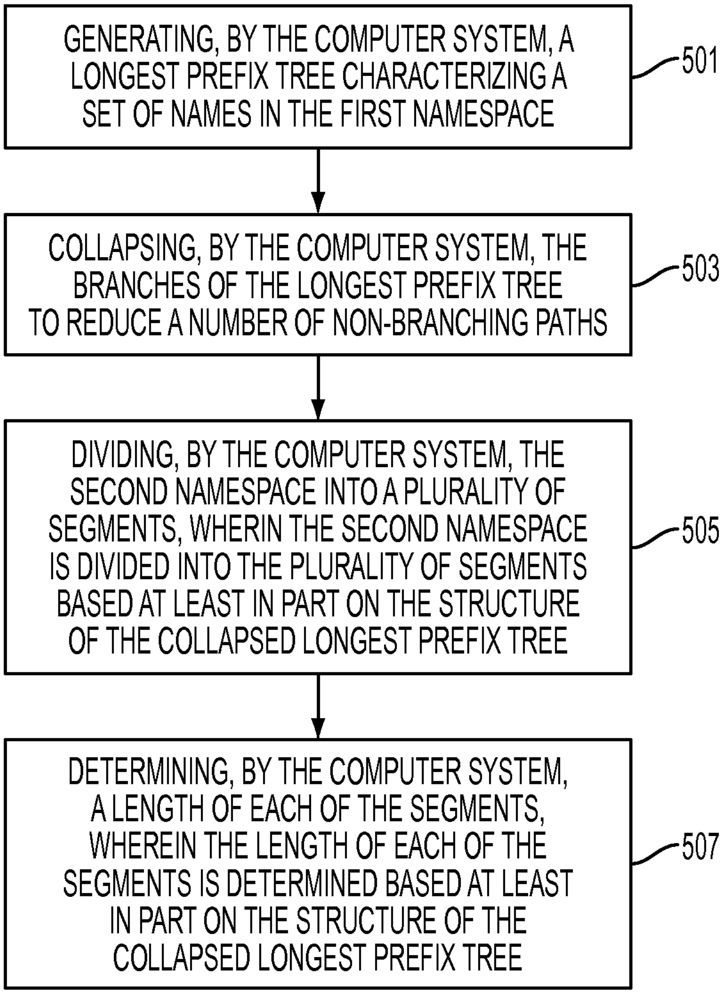
FIG. 5 depicts a block diagram of a method according to an embodiment of the present invention.

Referring now to FIG. 5, a method implemented in a computer system (or network) for mapping a variable length (or an arbitrarily long) name in a first namespace to a fixed size name in a second namespace is shown. As seen in this FIG. 5, the method comprises: Step 501—generating, by the computer system, a longest prefix tree characterizing a set of names in the first namespace; Step 503—collapsing, by the computer system, the branches of the longest prefix tree to reduce a number of non-branching paths; Step 505—dividing, by the computer system, the second namespace into a plurality of segments, wherein the second namespace is divided into the plurality of segments based at least in part on the structure of the collapsed longest prefix tree; and Step 507—determining, by the computer system, a length of each of the segments, wherein the length of each of the segments is determined based at least in part on the structure of the collapsed longest prefix tree.

Figure 6A:
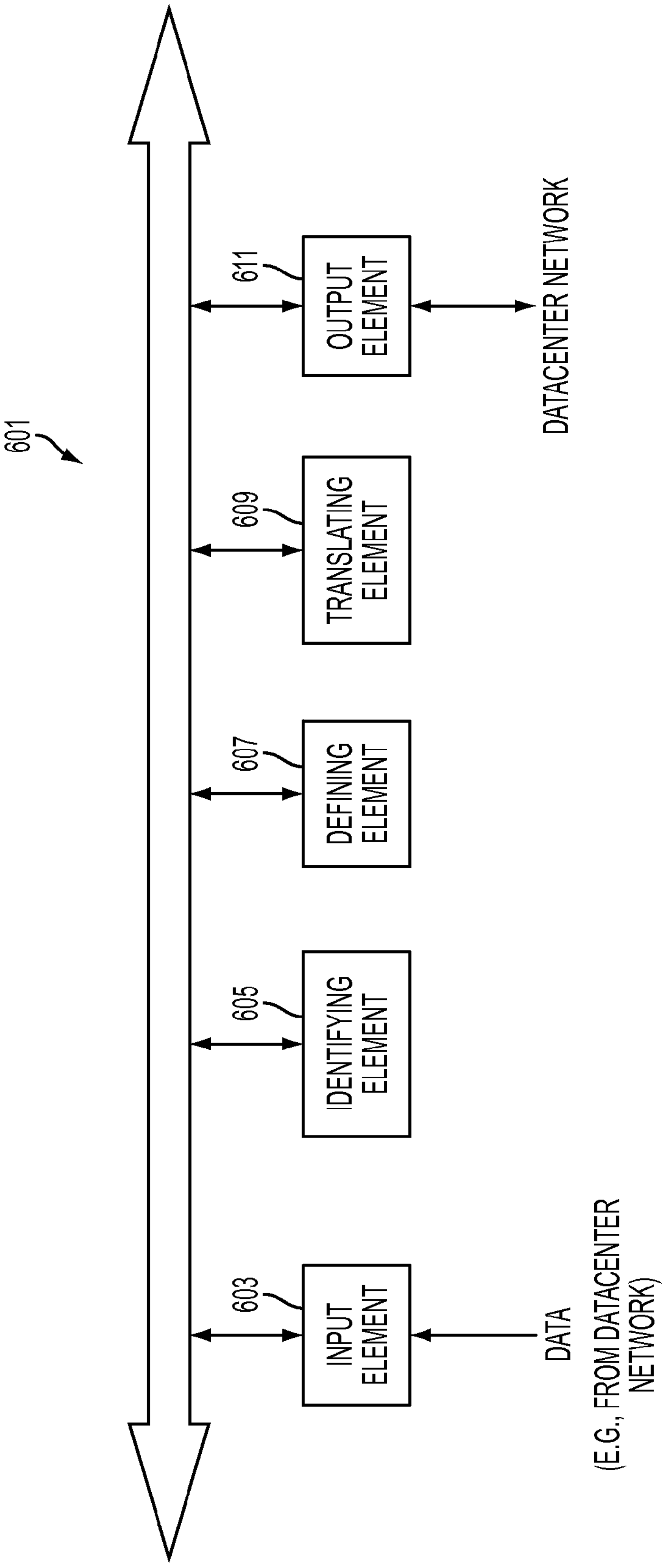
FIG. 6A depicts a block diagram of a system according to an embodiment of the present invention.

Referring now to FIG. 6A, a computer-implemented system 601 for handling data objects in a datacenter network, wherein the datacenter network has associated therewith a first namespace of variable (or arbitrary) name length and a second namespace of fixed name length is shown. As seen in this FIG. 6A, the system 601 may comprise: an input element 603 configured to receive a request, wherein the request includes a name of a data object; an identifying element 605 configured to identify a set of all possible names that can be created in the datacenter network in the first namespace (data to enable identification of the set of all possible names that can be created in the datacenter network in the first namespace may be received via input element 603); a defining element 607 in operative communication with the identifying element configured to define a mapping from the first namespace to the second namespace; a translating element 609 in operative communication with the input element and the defining element configured to translate the name in the request, wherein the name in the request is translated from a name in the first namespace to a name in the second namespace based at least in part upon the defined mapping; and an output element 611 in operative communication with the translating element configured to output the translated name in the second namespace.

Still referring to FIG. 6A, system 601 may further comprise a routing element (see e.g., controller 750 of FIG. 7) in operative communication with the output element configured to route the request using the translated name in the second namespace.

Still referring to FIG. 6A, any communications may be carried out via a network. Such a network may comprise the Internet, an intranet, a local area network, a wide area network and/or any other desired communication channel(s).

Figure 6B:
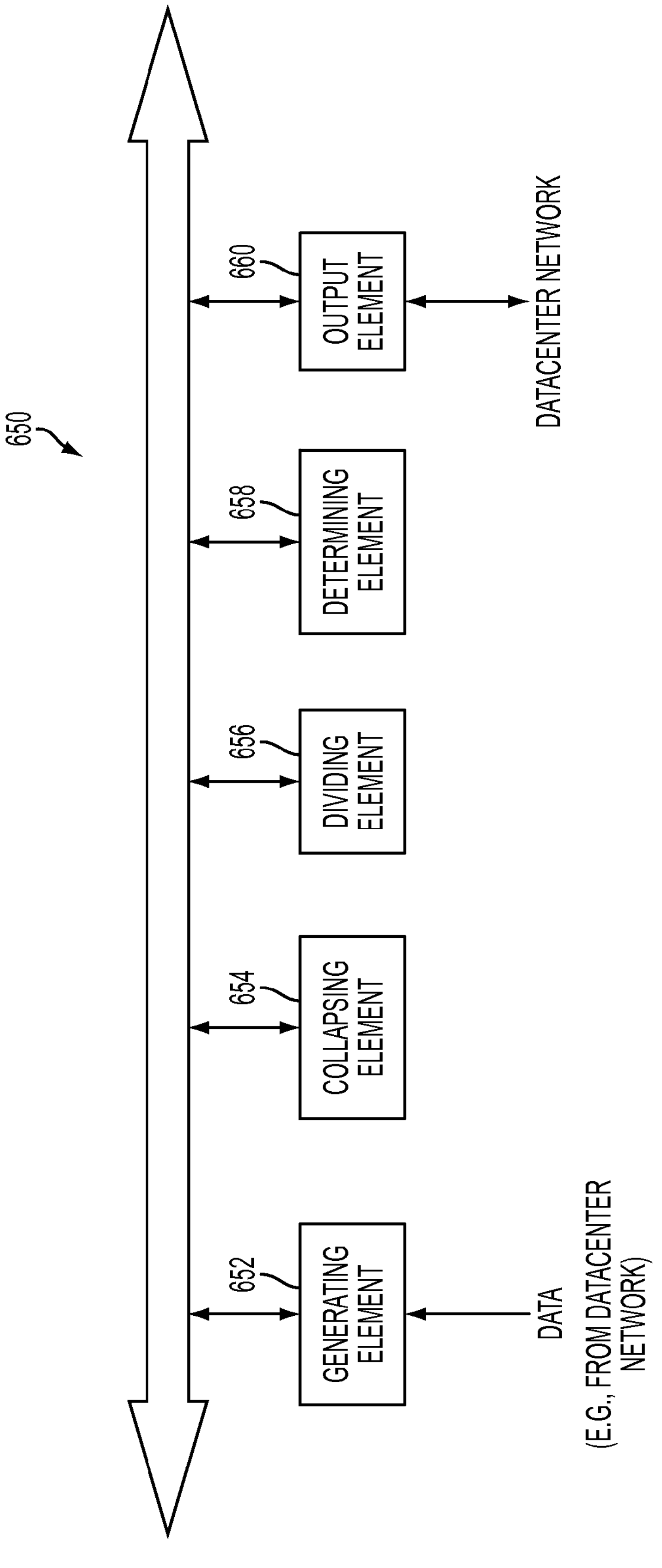
FIG. 6B depicts a block diagram of a system according to an embodiment of the present invention.

Referring now to FIG. 6B, it is seen that a computer-implemented system 650 for mapping a variable length (or an arbitrarily long) name in a first namespace to a fixed size name in a second namespace is shown. As seen in this FIG. 6B, the system 650 may comprise: a generating element 652 configured to generate a longest prefix tree characterizing a set of names in the first namespace (generating element 652 may receive data in order to generate a longest prefix tree characterizing a set of names in the first namespace); a collapsing element 654 in operative communication with the generating element configured to collapse the branches of the longest prefix tree to reduce a number of non-branching paths; a dividing element 656 in operative communication with the collapsing element configured to divide the second namespace into a plurality of segments, wherein the second namespace is divided into the plurality of segments based at least in part on the structure of the collapsed longest prefix tree; a determining element 658 in operative communication with the collapsing element and the dividing element configured to determine a length of each of the segments, wherein the length of each of the segments is determined based at least in part on the structure of the collapsed longest prefix tree; and an output element 660 in operative communication with the dividing element and the determining element configured to output the divided segments and the length of each of the divided segments (output may be used for processing requests using the first and/or second namespaces).

Still referring to FIG. 6B, any communications may be carried out via a network. Such a network may comprise the Internet, an intranet, a local area network, a wide area network and/or any other desired communication channel(s).

Figure 7:
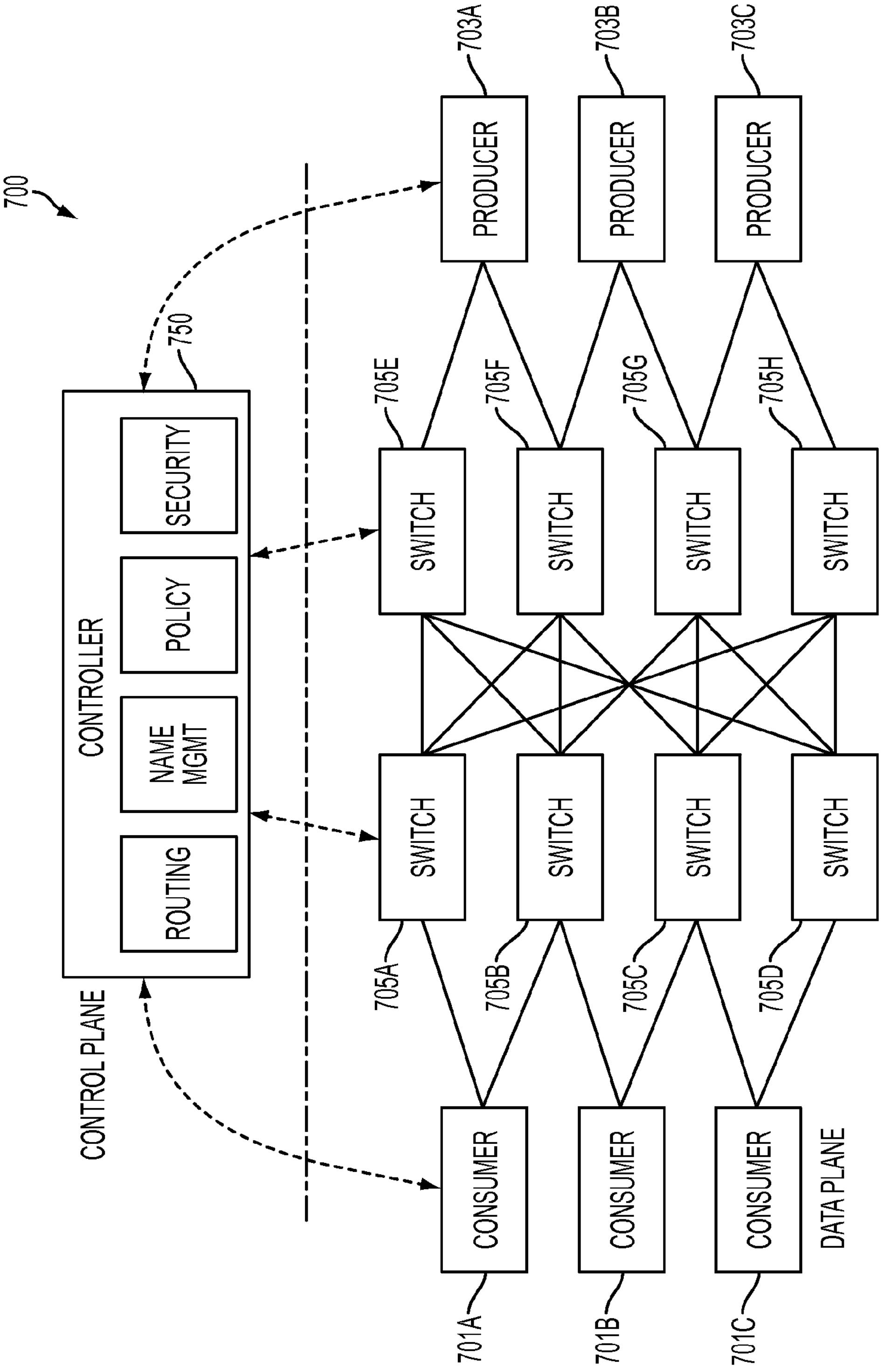
FIG. 7 depicts a block diagram of a system according to an embodiment of the present invention.

Referring now to FIG. 7, an example named data networking architecture 700 according to an embodiment is shown. As seen in this example, consumers 701A, 701B and 701C interact with producers 703A, 703B and 703C via switches (or routers) 705A, 705B, 705C, 705D, 705E, 7005F, 705G and/or 705H.

Further, controller 750 may include mechanisms for providing routing, name management (including, e.g., namespace definition, name identification, mapping definition, translating, tree generation, tree collapsing, namespace segment dividing, and namespace segment length determination as described herein), policy and/or security.

Still referring to FIG. 7, communication (e.g., requests, responses, data objects) between and among the various entities (indicated by the solid lines between the entities) may be bi-directional. Further, communication between and among the various entities and the controller 750 may be bi-directional (of note, controller 750 may communicate with any desired number of consumer(s), switch(s), router(s) and/or producer(s)). Further still, the communication may be carried out via the Internet, an intranet, a local area network, a wide area network and/or any other desired communication channel(s).

Of note, while FIG. 7 shows the various entities communicating, it is to be understood that this FIG. 7 is actually referring to communication by computer system(s) or the like that are owned, leased, operated, used by, in the possession of and/or controlled by each of the entities.

Figure 8:
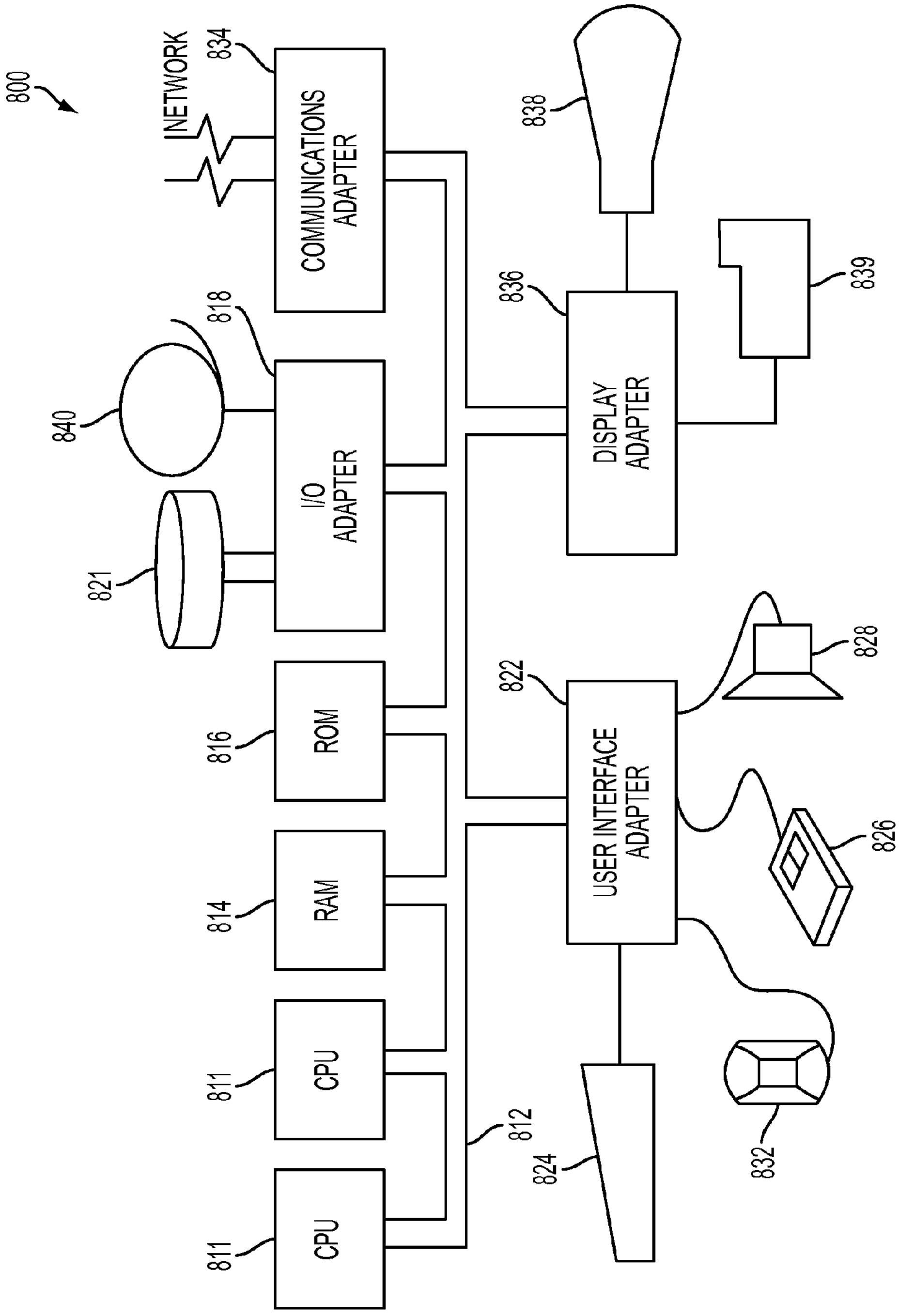
FIG. 8 depicts a block diagram of a system according to an embodiment of the present invention.

Referring now to FIG. 8, this figure shows a hardware configuration of computing system 800 according to an embodiment of the present invention. As seen, this hardware configuration has at least one processor or central processing unit (CPU) 811. The CPUs 811 are interconnected via a system bus 812 to a random access memory (RAM) 814, read-only memory (ROM) 816, input/output (I/O) adapter 818 (for connecting peripheral devices such as disk units 821 and tape drives 840 to the bus 812), user interface adapter 822 (for connecting a keyboard 824, mouse 826, speaker 828, microphone 832, and/or other user interface device to the bus 812), a communications adapter 834 for connecting the system 800 to a data processing network, the Internet, an intranet, a local area network (LAN), etc., and a display adapter 836 for connecting the bus 812 to a display device 838 and/or printer 839 (e.g., a digital printer or the like).

In one embodiment, a method implemented in a computer system for handling data objects in a datacenter network, wherein the datacenter network has associated therewith a first namespace of variable name length and a second namespace of fixed name length, is provided, the method comprising: identifying, by the computer system, a set of all names that exist in the datacenter network in the first namespace; defining a mapping from the first namespace to the second namespace; receiving, by the computer system, a request including a name of a data object; and translating, by the computer system, the name in the request, wherein the name in the request is translated from a name in the first namespace to a name in the second namespace based at least in part upon the defined mapping.

In one example, the method further comprises routing of requests for data objects in the datacenter network using the translated name in the second namespace.

In another example, the step of defining comprises: generating, by the computer system, a longest prefix tree characterizing a set of names in the first namespace; collapsing, by the computer system, the branches of the longest prefix tree to reduce a number of non-branching paths; and dividing, by the computer system, the second namespace into a plurality of segments, wherein the second namespace is divided into the plurality of segments based at least in part on the structure of the collapsed longest prefix tree.

In another example, the method further comprises determining, by the computer system, a length of each of the segments, wherein the length of each of the segments is determined based at least in part on the structure of the collapsed longest prefix tree.

In another example, the method further comprises determining, by the computer system, a length for each of the segments, wherein the length of each of the segments is determined at least in part on the basis of predicted growth of names in the first namespace.

In another example, the name in the request in the first namespace of variable length is in the form of at least one of: (a) a URI structure; and (b) a hierarchical structure.

In another example, the set of names currently existing in the datacenter further comprises a set of names which is forecast to exist in the data center sometime in the future.

In another example, the computer system further performs defining the first namespace of variable name length.

In another example, the computer system further performs defining the second namespace of fixed name length.

In another example, the defining the mapping from the first namespace to the second namespace is carried out by the computer system.

In another embodiment, a method implemented in a computer system for mapping an arbitrarily long name in a first namespace to a fixed size name in a second namespace is provided, the method comprising: generating, by the computer system, a longest prefix tree characterizing a set of names in the first namespace; collapsing, by the computer system, the branches of the longest prefix tree to reduce a number of non-branching paths; dividing, by the computer system, the second namespace into a plurality of segments, wherein the second namespace is divided into the plurality of segments based at least in part on the structure of the collapsed longest prefix tree; and determining, by the computer system, a length of each of the segments, wherein the length of each of the segments is determined based at least in part on the structure of the collapsed longest prefix tree.

In one example, the collapsing the branches of the longest prefix tree to reduce a number of non-branching paths comprises collapsing the branches of the longest prefix tree to minimize the number of non-branching paths.

In another example, the number of segments into which the second namespace is divided is based at least in part upon the length of a longest path in the collapsed longest prefix tree.

In another example, the number of segments into which the second namespace is divided is equal to the length of the longest path in the collapsed longest prefix tree.

In another example, the length of each of the segments into which the second namespace is divided is based at least in part upon a number of bits that can accommodate the branches that emanate out of a respective node of the collapsed longest prefix tree.

In another example, the length of each of the segments into which the second namespace is divided is based at least in part upon a predicted growth in the names in the first namespace.

In another embodiment, a computer readable storage medium, tangibly embodying a program of instructions executable by the computer for handling data objects in a datacenter network, wherein the datacenter network has associated therewith a first namespace of variable name length and a second namespace of fixed name length, is provided, the program of instructions, when executing, performing the following steps: identifying, by the computer, a set of all names that exist in the datacenter network in the first namespace; defining, by the computer, a mapping from the first namespace to the second namespace; receiving, by the computer, a request including a name of a data object; and translating, by the computer, the name in the request, wherein the name in the request is translated from a name in the first namespace to a name in the second namespace based at least in part upon the defined mapping.

In one example, the program of instructions, when executing, further performs the step of routing the request using the translated name in the second namespace.

In another example, the step of defining comprises: generating, by the computer system, a longest prefix tree characterizing a set of names in the first namespace; collapsing, by the computer system, the branches of the longest prefix tree to reduce a number of non-branching paths; and dividing, by the computer system, the second namespace into a plurality of segments, wherein the second namespace is divided into the plurality of segments based at least in part on the structure of the collapsed longest prefix tree.

In another example, the program of instructions, when executing, further performs the step of determining a length of each of the segments, wherein the length of each of the segments is determined based at least in part on the structure of the collapsed longest prefix tree.

In another example, the program of instructions, when executing, further performs the step of determining a length for each of the segments, wherein the length of each of the segments is determined at least in part on the basis of predicted growth of names in the first namespace.

In another example, the name in the request in the first namespace of variable length is in the form of at least one of: (a) a URI structure; and (b) a hierarchical structure.

In another example, the set of names currently existing in the datacenter further comprises a set of names which is forecast to exist in the data center sometime in the future.

In another embodiment, a computer readable storage medium, tangibly embodying a program of instructions executable by the computer for mapping an arbitrarily long name in a first namespace to a fixed size name in a second namespace, is provided, the program of instructions, when executing, performing the following steps: generating, by the computer, a longest prefix tree characterizing a set of names in the first namespace; collapsing, by the computer, the branches of the longest prefix tree to reduce a number of non-branching paths; dividing, by the computer, the second namespace into a plurality of segments, wherein the second namespace is divided into the plurality of segments based at least in part on the structure of the collapsed longest prefix tree; and determining, by the computer, a length of each of the segments, wherein the length of each of the segments is determined based at least in part on the structure of the collapsed longest prefix tree.

In one example, the collapsing the branches of the longest prefix tree to reduce a number of non-branching paths comprises collapsing the branches of the longest prefix tree to minimize the number of non-branching paths.

In another example, the number of segments into which the second namespace is divided is based at least in part upon the length of a longest path in the collapsed longest prefix tree.

In another example, the number of segments into which the second namespace is divided is equal to the length of the longest path in the collapsed longest prefix tree.

In another example, the length of each of the segments into which the second namespace is divided is based at least in part upon a number of bits that can accommodate the branches that emanate out of a respective node of the collapsed longest prefix tree.

In another example, the length of each of the segments into which the second namespace is divided is based at least in part upon a predicted growth in the names in the first namespace.

In another embodiment, a computer-implemented system for handling data objects in a datacenter network, wherein the datacenter network has associated therewith a first namespace of variable name length and a second namespace of fixed name length, is provided, the system comprising: an input element configured to receive a request, wherein the request includes a name of a data object; an identifying element configured to identify a set of all names that exist in the datacenter network in the first namespace; a defining element in operative communication with the identifying element configured to define a mapping from the first namespace to the second namespace; a translating element in operative communication with the input element and the defining element configured to translate the name in the request, wherein the name in the request is translated from a name in the first namespace to a name in the second namespace based at least in part upon the defined mapping; and an output element in operative communication with the translating element configured to output the translated name in the second namespace.

In one example, the system further comprises a routing element in operative communication with the output element configured to route the request using the translated name in the second namespace.

In another example, the defining element defines the mapping by: generating a longest prefix tree characterizing a set of names in the first namespace; collapsing the branches of the longest prefix tree to reduce a number of non-branching paths; and dividing the second namespace into a plurality of segments, wherein the second namespace is divided into the plurality of segments based at least in part on the structure of the collapsed longest prefix tree.

In another example, the system further comprises a determining element configured to determine a length of each of the segments, wherein the length of each of the segments is determined based at least in part on the structure of the collapsed longest prefix tree.

In another example, the system further comprises a determining element configured to determine a length for each of the segments, wherein the length of each of the segments is determined at least in part on the basis of predicted growth of names in the first namespace.

In another example, the name in the request in the first namespace of variable length is in the form of at least one of: (a) a URI structure; and (b) a hierarchical structure.

In another example, the set of names currently existing in the datacenter further comprises a set of names which is forecast to exist in the data center sometime in the future.

In another embodiment, a computer-implemented system for mapping an arbitrarily long name in a first namespace to a fixed size name in a second namespace is provided, the system comprising: a generating element configured to generate a longest prefix tree characterizing a set of names in the first namespace; a collapsing element in operative communication with the generating element configured to collapse the branches of the longest prefix tree to reduce a number of non-branching paths; a dividing element in operative communication with the collapsing element configured to divide the second namespace into a plurality of segments, wherein the second namespace is divided into the plurality of segments based at least in part on the structure of the collapsed longest prefix tree; a determining element in operative communication with the collapsing element and the dividing element configured to determine a length of each of the segments, wherein the length of each of the segments is determined based at least in part on the structure of the collapsed longest prefix tree; and an output element in operative communication with the dividing element and the determining element configured to output the divided segments and the length of each of the divided segments.

In one example, the collapsing the branches of the longest prefix tree to reduce a number of non-branching paths comprises collapsing the branches of the longest prefix tree to minimize the number of non-branching paths.

In another example, the number of segments into which the second namespace is divided is based at least in part upon the length of a longest path in the collapsed longest prefix tree.

In another example, the number of segments into which the second namespace is divided is equal to the length of the longest path in the collapsed longest prefix tree.

In another example, the length of each of the segments into which the second namespace is divided is based at least in part upon a number of bits that can accommodate the branches that emanate out of a respective node of the collapsed longest prefix tree.

In another example, the length of each of the segments into which the second namespace is divided is based at least in part upon a predicted growth in the names in the first namespace.

In various examples, any steps may be carried out in the order recited or the steps may be carried out in another order.

In various examples, embodiments may be used in the context of: (a) cloud: delivery model: Platform as a Service (PaaS); (b) cloud: deployment model: private; (c) cloud: deployment model: public; (d) cloud: enablement technology; (e) converged communications: protocols (e.g., network); and/or (f) software: content applications.

As described herein, mechanisms are provided for utilizing a set of fixed length named data networking names for accessing data in a datacenter. In one example, mechanisms are provided for mapping the set of all (currently used) valid, variable length named data networking names to a set of fixed length names and using the fixed length named data networking names for routing and/or searching of content.

In this regard, although a set of names in general can be unbounded, datacenter networks have the advantage that the set of all (currently used) names that can be accessed in a data center are known in advance. Thus, at any time, only a finite set of valid names are present. This can then be used to determine a mapping between names of variable length and fixed size names that still preserve uniqueness (as well as a significant amount of structure).

As described herein, various embodiments provide for a name structure that is amenable to fast processing, and which preserves the flexibility of variable length hierarchical structured names.

As described herein, various embodiments provide for dealing with variable length names in content-aware networks/named data networks.

As described herein, mechanisms are provided for mapping each instance of a single variable length name to one instance of a fixed length name. The mapping may be done so that the hierarchical structure of the original variable length name is preserved (thus allowing an efficient, succinct and general way to use a fixed name).

As described herein, mechanisms are provided for compressing commonality in common prefixes (which may be suitable for operations like route lookups).

As described herein, mechanisms are provided for using the structure of the different names present in a particular datacenter network to compress prefixes (resulting in a compact namespace).

As described herein, mechanisms are provided for converting a variable length hierarchical name into a fixed length name for performing lookup operations in a in a named data network in the context of content aware routing.

As described herein, mechanisms are provided for converting a variable length name into multiple fixed length names for performing lookup operations in a in a named data network in the context of content aware routing.

In another example, a request is in the form of at least one request packet.

In another example, a request is received as a plurality of request packets.

In another example, a translated name in the second namespace of fixed length is between 32 and 128 bits long.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A computer readable storage medium, tangibly embodying a program of instructions executable by the computer for handling data objects in a datacenter network, wherein the datacenter network has associated therewith a first namespace of variable name length and a second namespace of fixed name length, the program of instructions, when executing, performing the following steps:

identifying, by the computer, a set of all names that exist in the datacenter network in the first namespace;

defining, by the computer, a mapping from the first namespace to the second namespace;

receiving, by the computer, a request including a name of a data object; and translating, by the computer, the name in the request, wherein the name in the request is translated from a name in the first namespace to a name in the second namespace based at least in part upon the defined mapping;

wherein the step of defining comprises:

generating, by the computer, a longest prefix tree characterizing a set of names in the first namespace;

collapsing, by the computer, the branches of the longest prefix tree to reduce a number of non-branching paths; and dividing, by the computer, the second namespace into a plurality of segments, wherein the second namespace is divided into the plurality of segments based at least in part on the structure of the collapsed longest prefix tree; and wherein the program of instructions, when executing, further performs the step of determining a length for each of the segments, wherein the length of each of the segments is determined at least in part on the basis of predicted growth of names in the first namespace.

2. The computer readable storage medium of claim 1, wherein the program of instructions, when executing, further performs the step of routing the request using the translated name in the second namespace.

3. The computer readable storage medium of claim 1, wherein the length of each of the segments is further determined based at least in part on the structure of the collapsed longest prefix tree.

4. The computer readable storage medium of claim 1, wherein the name in the request in the first namespace of variable length is in the form of at least one of: (a) a URI structure; and (b) a hierarchical structure.

5. The computer readable storage medium of claim 1, wherein the set of names currently existing in the datacenter further comprises a set of names which is forecast to exist in the data center sometime in the future.

6. A computer readable storage medium, tangibly embodying a program of instructions executable by the computer for mapping an arbitrarily long name in a first namespace to a fixed size name in a second namespace, the program of instructions, when executing, performing the following steps:

generating, by the computer, a longest prefix tree characterizing a set of names in the first namespace;

collapsing, by the computer, the branches of the longest prefix tree to reduce a number of non-branching paths;

dividing, by the computer, the second namespace into a plurality of segments, wherein the second namespace is divided into the plurality of segments based at least in part on the structure of the collapsed longest prefix tree; and determining, by the computer, a length of each of the segments, wherein the length of each of the segments is determined based at least in part on the structure of the collapsed longest prefix tree;

wherein the length of each of the segments into which the second namespace is divided is based at least in part upon a predicted growth in the names in the first namespace.

7. The computer readable storage medium of claim 6, wherein the collapsing the branches of the longest prefix tree to reduce a number of non-branching paths comprises collapsing the branches of the longest prefix tree to minimize the number of non-branching paths.

8. The computer readable storage medium of claim 6, wherein the number of segments into which the second namespace is divided is based at least in part upon the length of a longest path in the collapsed longest prefix tree.

9. The computer readable storage medium of claim 8, wherein the number of segments into which the second namespace is divided is equal to the length of the longest path in the collapsed longest prefix tree.

10. The computer readable storage medium of claim 6, wherein the length of each of the segments into which the second namespace is divided is based at least in part upon a number of bits that can accommodate the branches that emanate out of a respective node of the collapsed longest prefix tree.

11. A computer-implemented system for handling data objects in a datacenter network, wherein the datacenter network has associated therewith a first namespace of variable name length and a second namespace of fixed name length, the system comprising:

an input element configured to receive a request, wherein the request includes a name of a data object;

an identifying element configured to identify a set of all names that exist in the datacenter network in the first namespace;

a defining element in operative communication with the identifying element configured to define a mapping from the first namespace to the second namespace;

a translating element in operative communication with the input element and the defining element configured to translate the name in the request, wherein the name in the request is translated from a name in the first namespace to a name in the second namespace based at least in part upon the defined mapping; and an output element in operative communication with the translating element configured to output the translated name in the second namespace;

wherein the defining element defines the mapping by:

generating a longest prefix tree characterizing a set of names in the first namespace;

collapsing the branches of the longest prefix tree to reduce a number of non-branching paths; and dividing the second namespace into a plurality of segments, wherein the second namespace is divided into the plurality of segments based at least in part on the structure of the collapsed longest prefix tree;

the system further comprising a determining element configured to determine a length for each of the segments, wherein the length of each of the segments is determined at least in part on the basis of predicted growth of names in the first namespace.

12. The system of claim 11, further comprising a routing element in operative communication with the output element configured to route the request using the translated name in the second namespace.

13. The system of claim 11, wherein the length of each of the segments is further determined based at least in part on the structure of the collapsed longest prefix tree.

14. The system of claim 11, wherein the name in the request in the first namespace of variable length is in the form of at least one of: (a) a URI structure; and (b) a hierarchical structure.

15. The system of claim 11, wherein the set of names currently existing in the datacenter further comprises a set of names which is forecast to exist in the data center sometime in the future.

16. A computer-implemented system for mapping an arbitrarily long name in a first namespace to a fixed size name in a second namespace, the system comprising:

a generating element configured to generate a longest prefix tree characterizing a set of names in the first namespace;

a collapsing element in operative communication with the generating element configured to collapse the branches of the longest prefix tree to reduce a number of non-branching paths;

a dividing element in operative communication with the collapsing element configured to divide the second namespace into a plurality of segments, wherein the second namespace is divided into the plurality of segments based at least in part on the structure of the collapsed longest prefix tree;

a determining element in operative communication with the collapsing element and the dividing element configured to determine a length of each of the segments, wherein the length of each of the segments is determined based at least in part on the structure of the collapsed longest prefix tree; and an output element in operative communication with the dividing element and the determining element configured to output the divided segments and the length of each of the divided segments;

wherein the length of each of the segments into which the second namespace is divided is based at least in part upon a predicted growth in the names in the first namespace.

17. The system of claim 16, wherein the collapsing the branches of the longest prefix tree to reduce a number of non-branching paths comprises collapsing the branches of the longest prefix tree to minimize the number of non-branching paths.

18. The system of claim 16, wherein the number of segments into which the second namespace is divided is based at least in part upon the length of a longest path in the collapsed longest prefix tree.

19. The system of claim 18, wherein the number of segments into which the second namespace is divided is equal to the length of the longest path in the collapsed longest prefix tree.

20. The system of claim 16, wherein the length of each of the segments into which the second namespace is divided is based at least in part upon a number of bits that can accommodate the branches that emanate out of a respective node of the collapsed longest prefix tree.

* * * * *